United States Patent
Pan et al.

(10) Patent No.: US 12,316,857 B2
(45) Date of Patent: May 27, 2025

(54) QUANTIZATION PARAMETER MAP FOR VIDEO ENCODING WITH CONSTANT PERCEPTUAL QUALITY

(71) Applicant: ATI Technologies ULC, Markham (CA)

(72) Inventors: Feng Pan, Markham (CA); Crystal Yeong-Pian Sau, Markham (CA); Wei Gao, Markham (CA); Mingkai Shao, Markham (CA); Dong Liu, Markham (CA); Ihab M. A. Amer, Markham (CA); Gabor Sines, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 17/135,972

(22) Filed: Dec. 28, 2020

(65) Prior Publication Data
US 2022/0210432 A1     Jun. 30, 2022

(51) Int. Cl.
*H04N 19/14*     (2014.01)
*H04N 19/124*    (2014.01)
*H04N 19/176*    (2014.01)
*H04N 19/196*    (2014.01)

(52) U.S. Cl.
CPC ........... *H04N 19/14* (2014.11); *H04N 19/124* (2014.11); *H04N 19/176* (2014.11); *H04N 19/196* (2014.11)

(58) Field of Classification Search
CPC .. H04N 19/176; H04N 19/117; H04N 19/159; H04N 19/70; H04N 19/46; H04N 19/157; H04N 19/136; H04N 19/86; H04N 19/147; H04N 19/14
See application file for complete search history.

(56) References Cited

U.S. PATENT DOCUMENTS

2008/0304562 A1*  12/2008  Chang .................. H04N 19/124
                                                       375/240.03
2020/0267396 A1*  8/2020  Zhang .................. H04N 19/154

* cited by examiner

*Primary Examiner* — Farhan Mahmud
(74) *Attorney, Agent, or Firm* — Volpe Koenig

(57) ABSTRACT

A processing apparatus and video encoding method are provided which include receiving a portion of a video sequence and determining complexities for blocks of pixels of the portion of the video sequence. Quantization parameter values for corresponding blocks of pixels are selected based on complexities of the corresponding blocks and visually perceived coding artifacts of the corresponding blocks produced by the quantization parameter values. The blocks of pixels are encoded, using the selected quantization parameter values. The blocks of pixels are decoded and the portion of the video sequence is provided for display.

27 Claims, 7 Drawing Sheets

QUANTIZATION PARAMETER MAP FOR VIDEO ENCODING WITH CONSTANT PERCEPTUAL QUALITY

BACKGROUND

Video encoding (compression) is used reduce the number of bits used to represent the content in a video sequence. In block-based video encoding, a video frame or slice is typically divided into blocks of pixels, each pixel having a value (e.g., luminance values and chrominance values) represented by one or more bits. Rate control techniques used in block-based video encoding are typically based on either a constant bitrate or a constant quantization parameter (QP). For example, when a constant bitrate algorithm is used, the bits are evenly distributed between the pixel blocks (e.g., between the pixel blocks of a frame). Alternatively, when a constant QP algorithm is used, the number of bits allocated to each block is determined based on the same QP to each block of the frame.

BRIEF DESCRIPTION OF THE DRAWINGS

A more detailed understanding can be had from the following description, given by way of example in conjunction with the accompanying drawings wherein.

DETAILED DESCRIPTION

Figure 1:
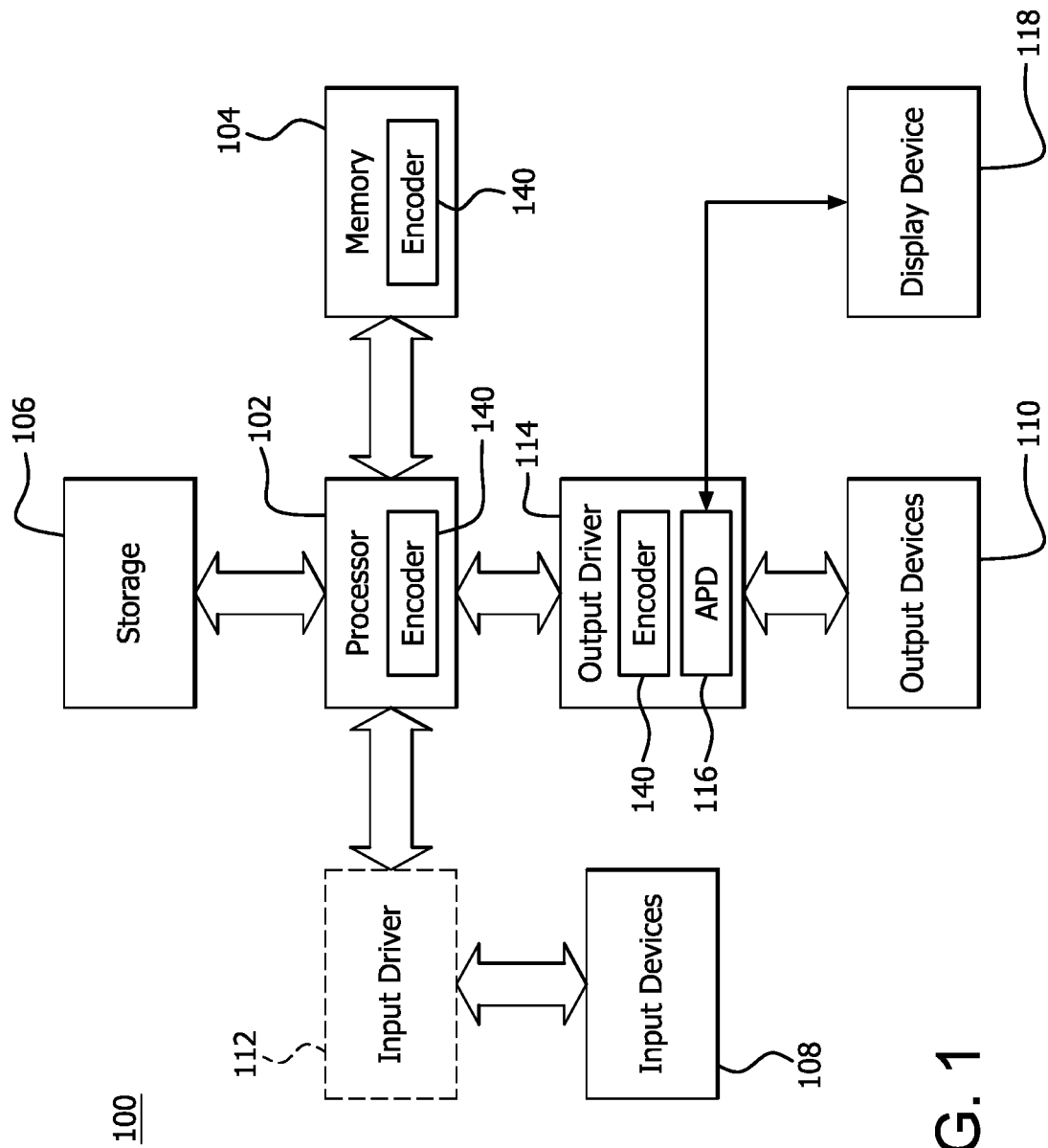
FIG. 1 is a block diagram of an example device in which one or more features of the disclosure can be implemented.

Conventional rate control techniques, which use a constant bitrate algorithm or a constant QP algorithm, do not consider the impact on visual perception of a QP applied to blocks with different complexities. Some conventional rate control techniques are based on perceptual models to regulate the distortion and cost in a rate-distortion optimization (RDO) process. These conventional rate control techniques do not, however, consider the impact on visual perception of a QP applied to blocks with different complexities. Accordingly, these conventional rate control techniques typically cause visually perceived quality fluctuation among the blocks, resulting in a poor overall quality.

In contrast to conventional constant bitrate control techniques, features of the present application allocate the bits to the blocks of a portion (e.g., a frame of the video) of the video based on the visually perceived quality of blocks, such that less complex blocks use less bits to achieve the same quality as more complex blocks. In contrast to conventional constant QP rate control techniques, features of the present disclosure determine a QP to be applied to the blocks of the frame according to the coding artifacts (e.g., blocking artifacts) resulting from the quantization by the selected QP.

Features of the present disclosure provide apparatuses and methods which determine the QP to allocate bits to the blocks of a portion of the video (e.g., a frame of the video) such that the encoded blocks have the same or similar visually perceived quality (e.g., the same or similar visually perceived degree of distortion due, for example, to visual masking) when the encoded video is, thereafter, decoded. The number of bits, allocated to a block of pixels, is determined such that the visually perceived quality of the block is similar to the visually perceived quality of other blocks of pixels (e.g., other blocks of a frame), resulting in a better overall video quality. Bits from less complex blocks where distortion is less noticeable (e.g., due to visual masking) are allocated to more complex blocks where distortion is more noticeable such that fluctuation between the visually perceived quality of the blocks is reduced. In addition, to meet a target bit rate, bits are reallocated from blocks encoded with higher quantization parameter values to blocks encoded with lower quantization parameter values.

As described herein, a portion of a video sequence can include, for example, a frame or image, a portion of a frame or image, a slice or a plurality of pixel blocks. As described herein, images and frames are used interchangeably.

A video encoding method is provided which comprises receiving a portion of a video sequence and determining complexities for blocks of pixels of the portion of the video sequence. The method also comprises selecting quantization parameter values for corresponding blocks of pixels based on complexities of the corresponding blocks and visually perceived coding artifacts of the corresponding blocks produced by the quantization parameter values, encoding the blocks of pixels using the selected quantization parameter values, decoding the blocks of pixels and providing the portion of the video sequence for display.

A processing apparatus is provided which comprises memory and a processor. The processor is configured to receive a portion of a video sequence and determine complexities for blocks of pixels of the portion of the video sequence. The processor is configured to select quantization parameter values for corresponding blocks of pixels based on complexities of the corresponding blocks and visually perceived coding artifacts of the corresponding blocks produced by the quantization parameter values, encode the blocks of pixels using the selected quantization parameter values, decode the blocks of pixels and provide the portion of the video sequence for display.

A non-transitory computer readable medium is provided which comprises instructions for causing a computer to execute a video encoding method comprising receiving a portion of a video sequence, determining complexities for blocks of pixels of the portion of the video sequence, selecting quantization parameter values for corresponding blocks of pixels based on complexities of the corresponding blocks and visually perceived coding artifacts of the corresponding blocks produced by the quantization parameter values, encoding the blocks of pixels using the selected quantization parameter values, decoding the blocks of pixels and providing the portion of the video sequence for display.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a video capture device (e.g., a visual light camera, infrared laser or other camera) an image sensor, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. As shown in FIG. 1, the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. In addition to processing compute and graphics rendering commands and providing pixel output to display device 118, APD 116 may also control the encoder 140 for encoding video images according to features of the disclosure. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

A video encoder 140 is shown in two different alternative forms. In a first form, the encoder 140 is software that is stored in the memory 104 and that executes on the processor 102 as shown. In a second form, the encoder 140 is at least a portion of a hardware video engine (not shown) that resides in output driver 114. In other forms, the encoder 140 is a combination of software and hardware elements, with the hardware residing, for example, in output drivers 114, and the software executed on, for example, the processor 102.

Figure 2:
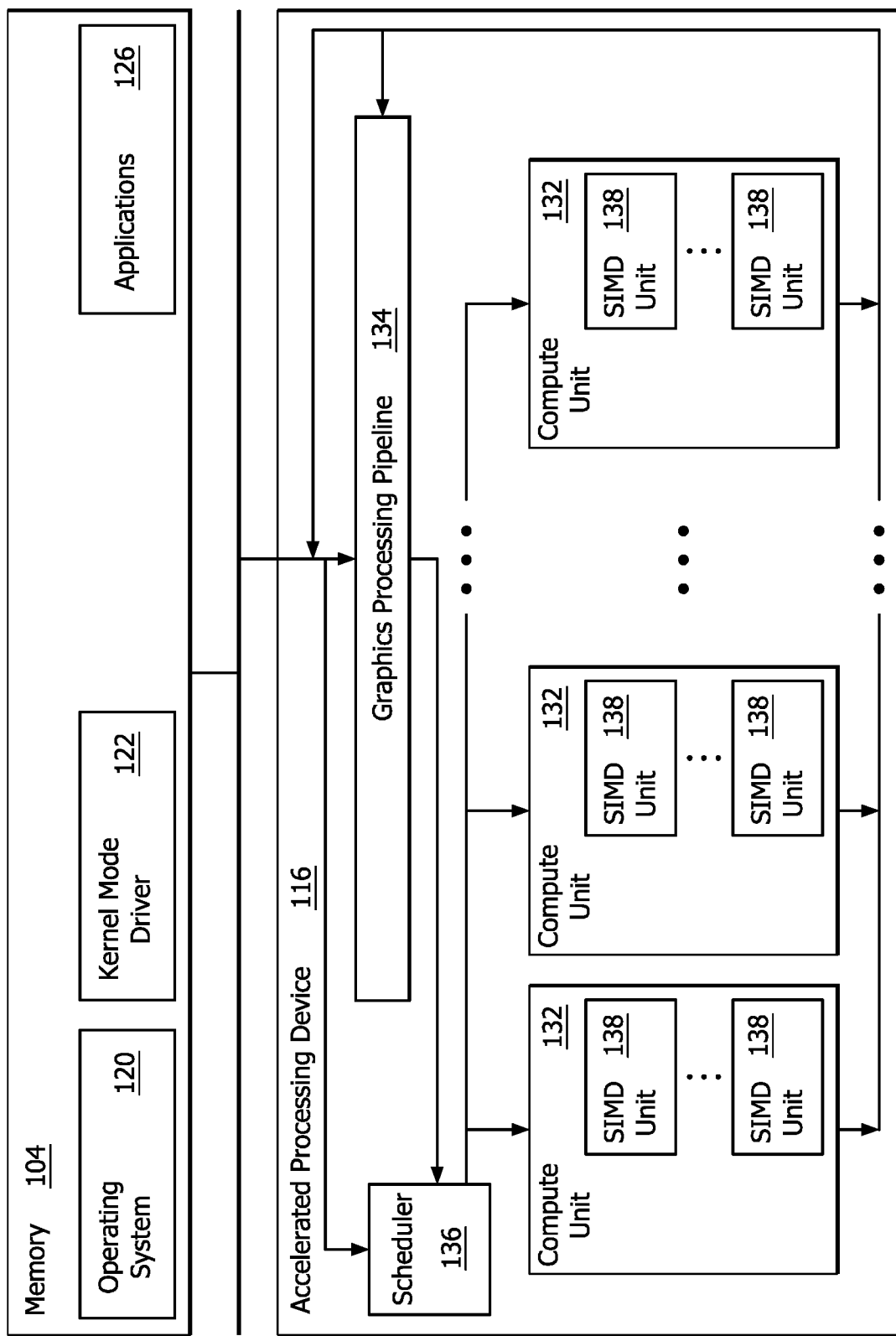
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
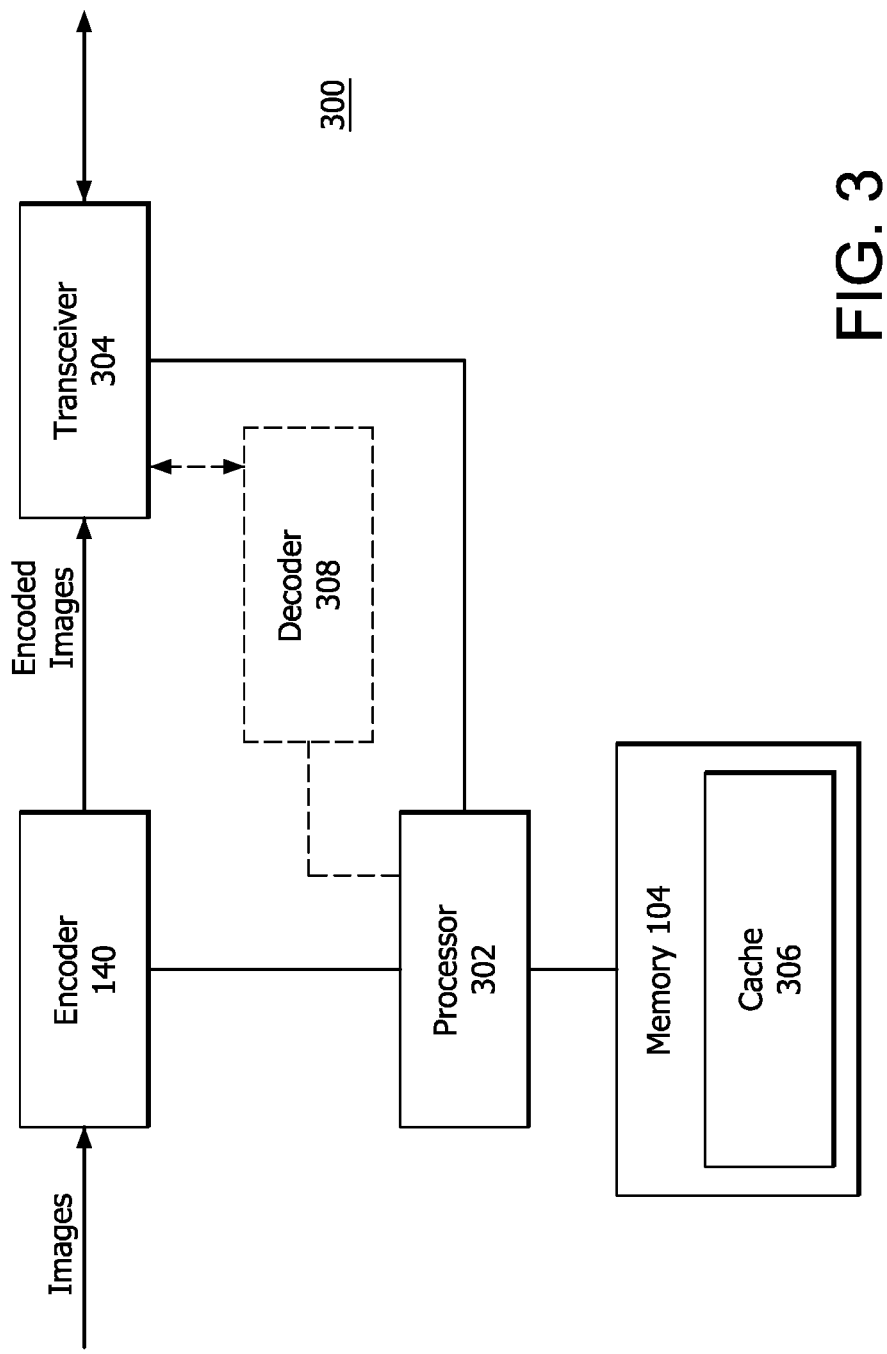
FIG. 3 is a block diagram illustrating exemplary components of a processing device in which one or more features of the disclosure can be implemented.

FIG. 3 is a block diagram illustrating exemplary components of a processing device 300 in which one or more features of the disclosure can be implemented. Processing device 300 is used to process and compress video images as described in more detail below. As shown in FIG. 3, processing apparatus 300 comprises processor 302, encoder 140, transceiver 304 and memory 104, including cache 306.

Processor 302 is, for example, processor 102 (shown in FIG. 1), APD 116 (shown in FIGS. 1 and 2) or one or more compute units 132. As shown in FIG. 3, processor 302 is in communication with encoder 140, transceiver 304 and memory 104, which includes cache 306. Encoder 140 is configured to receive video images and instructions from processor 302 and encode the video images to be later decoded by a decoder (e.g., decoder 308) and displayed (e.g., at display device 118). The video images may be received from one or more video sources, such as a video capture device (e.g., a camera), a storage device (e.g., storage 106), a video content provider, and a device for generating graphics (e.g., APD 116).

Transceiver 304 is configured to receive the encoded images and provide the encoded images to be later decoded (e.g., decoder 308) and provided for display (e.g., at display device 118). The encoded video images are sent, for example, via a network interface controller (NIC) over one or more networks (e.g., local area network), including wired (e.g., Ethernet) or wireless networks (e.g., via WiFi, Bluetooth, and other wireless standards) to a decoder at a remote device (not shown).

Alternatively, as shown in phantom in FIG. 3, the processing device 300 includes decoder 308 and transceiver 304 is configured to transmit (e.g., via a local device bus) the encoded video images to decoder 308. When encoded images are sent, via one or more networks, from a remote device (not shown), transceiver 304 is configured to receive the encoded images and provide the encoded images to the decoder 308 to be decoded and displayed (e.g., at display device 118).

Processor 302 is configured to perform various functions to implement block-based video coding described herein, such as receiving portions (e.g., frames) of a video sequence, determining complexities (e.g., variances and gradients) of blocks of pixels of the frames, selecting QP values for each block of pixels based on block complexities and visually perceived coding artifacts produced by the selected QP values and encoding blocks of pixels using the selected QP values. Processor 302 is configured to control the encoder 140 for encoding the blocks of pixels according to features of the disclosure.

The processor 302 is configured to select QP values for the blocks of the frame such that, when displayed, the blocks of the portion of the video sequence have a similar visually perceived quality. For example, the processor 302 is configured to select, from a group of stored QP values (e.g., a look-up table), the highest QP value determined to produce an image having (e.g., satisfying) a target visually perceived quality. The determination of which QP value to select to provide the similar visually perceived quality is now described below.

In block-based video coding, a different QP can be applied to each block to regulate the number of bits generated and achieve a target bitrate. As the QP is increased, a smaller number of bits is used to compress a block, but the visual quality of the decoded block decreases. Table 1 below shows different numbers of bits used to encode 2 different example images (i.e., Image 1 and Image 2), having different complexities, according to different QP values of 30, 34, 37 and 41. Image 1 and Image 2 are not shown.

TABLE 1

| QP | # of bits for Image 1 | # of bits for Image 2 |
|----|-----------------------|-----------------------|
| 30 | 142,896 | 28,760,411 |
| 34 | 99,312 | 19,308,336 |
| 37 | 77,048 | 14,215,435 |
| 41 | 52,437 | 8,983,384 |

In the examples described herein, the visually perceived qualities of Image 1 and Image 2 are assumed for purposes of describing the relationship between constant QP values and visually perceived qualities of different images. It is also assumed, for explanation purposes, that the complexity of Image 2 is greater (higher) than the complexity of Image 1.

By way of example, when each block of pixels in Image 1 is quantized at a constant QP value of 37, the resulting decoded Image 1 is assumed to exhibit strong coding artifacts, which are visually perceived lines representing the borders between adjacent blocks of pixels. When each block of pixels in Image 2, which has a higher complexity than Image 1, is quantized at the same constant QP value of 37, the resulting decoded Image 2 shows minor coding artifacts. That is, the visually perceived quality of the resulting decoded Image 2 quantized at the constant QP value of 37 results in a different and better visually perceived quality than the resulting decoded Image 1 quantized at the same constant QP value of 37. The difference in visually perceived quality is due, for example, to a psycho-visual phenomenon known as spatial masking. Although both images are quantized at the same constant QP value of 37, the higher complexity of Image 2 suppresses the coding artifacts and causes the coding artifacts to be less noticeable than the coding artifacts visually perceived from resulting Image 1. That is, the visually perceived qualities of different images, quantized at the same constant QP value, varies depending on the complexities of the images.

By way of further example, the visually perceived quality of resulting Image 1, quantized at a constant QP value of 30, is assumed to be the same or similar to the visually perceived quality of resulting Image 2, quantized at a constant QP value of 37. That is, different QP values applied to images of different complexities can result in the same or similar visually perceived quality. Based on the examples described above, it can be concluded that a constant QP value does not result in constant perceptual quality. In addition, 142,896 bits are used to encode Image 1, quantized at a constant QP value of 30, while 14,215,435 bits are used to encode Image 1, quantized at a constant QP value of 37. Accordingly, many less bits are used to encode Image 1 than Image 2 to produce the same or similar visually perceived quality.

In block-based video coding, blocks of pixels are typically quantized separately in the coding process. When blocks are quantized with higher QP values, an example of coding artifacts, known as blocking artifacts (i.e., visually perceived lines or discontinuities representing the borders between adjacent blocks), are typically the most noticeable type of visual distortion of the resulting image. In addition, because other artifacts are well correlated to these blocking artifacts, the blocking artifacts can be used as a quality indicator to determine which constant QP value is to be applied.

Figure 4:
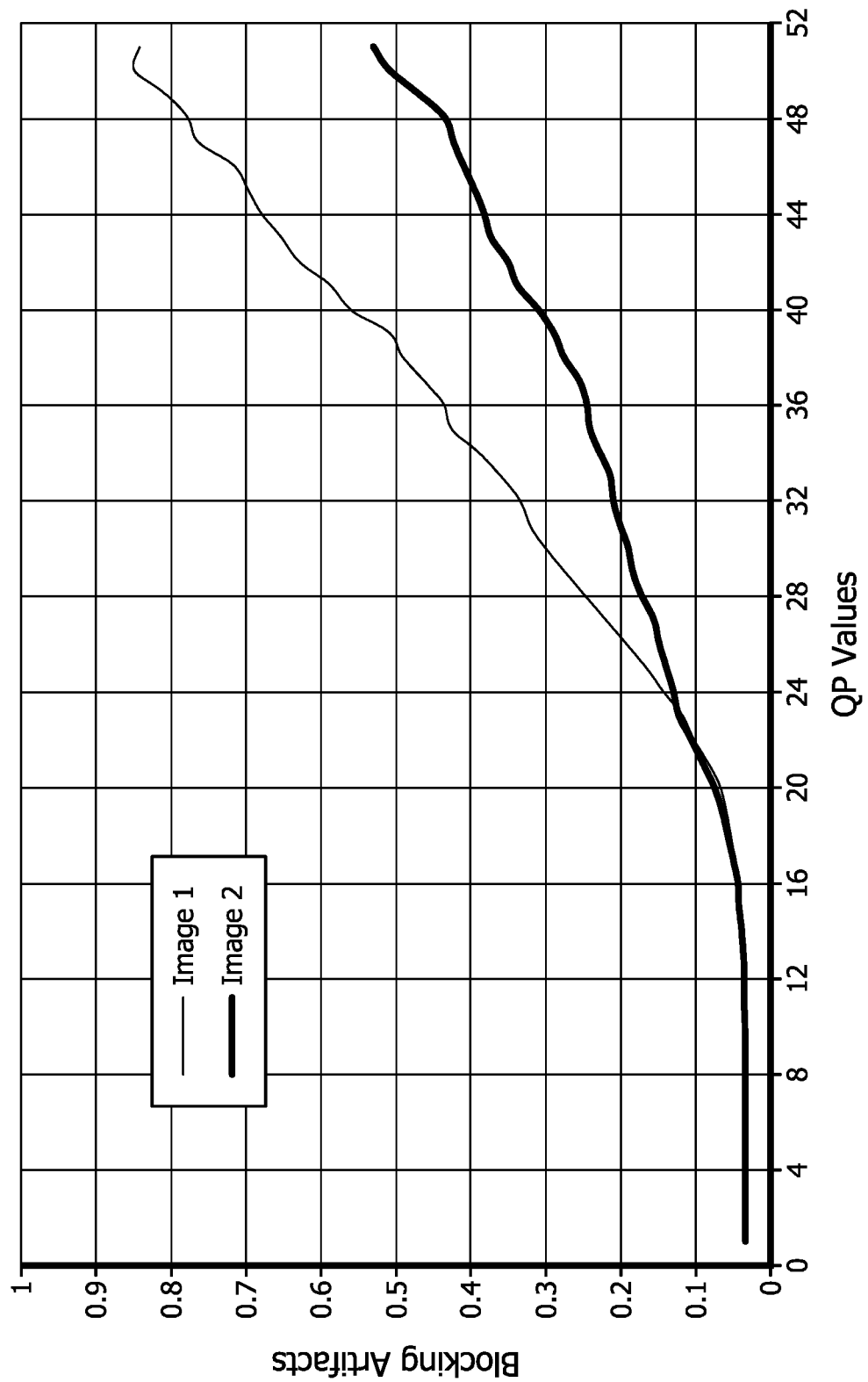
FIG. 4 is a graphical illustration of the relationship between visually perceived blocking artifacts for different images quantized at different QP values.

FIG. 4 is a graphical illustration of the relationship between visually perceived blocking artifacts for different images quantized at different QP values. The vertical axis in FIG. 4 represents the normalized values of visually perceived blocking artifacts for resulting Image 1 and Image 2 referred to above. The horizontal axis represents different QP values used to encode frames for the resulting decoded Image 1 and Image 2.

As shown in FIG. 4, as the QP value increases, blocking artifacts become severe due to a more coarse quantization. The blocking artifacts of the more complex Image 1 increase much faster than the blocking artifacts of the more complex Image 2 as the QP values increase, which is typically due to spatial masking. In other words, for the higher QP values, when the same QP values are applied to the blocks of two different frames, the blocking artifacts become less noticeable for more complex blocks than less complex blocks. That is, as illustrated by graphical illustration shown in FIG. 4, the constant quality QP value for a block is determined by the complexity of the block.

Examples of different types of measurements of complexity include variance, gradient, DCT coefficients and edges. A reason for using pixel variance as a complexity parameter for determining a QP value, however, is because pixel variance has a high correlation with spatial masking.

Based on the description above, the processor 302 determines complexities (e.g., variances and gradients) of blocks of pixels of the frames. Block complexity is, for example, derived from block variance. For example, for a block X of m×n pixels, where $x_{i,j}$, i=1 to m, j=1 to n are the pixel values, the variance of the block is calculated in Equation 1 as:

$$S(X) = \frac{\sum_{i=1}^{m}\sum_{j=1}^{m}(x_{i,j}-\bar{x})^2}{m \times n}, \bar{x} = \frac{\sum_{i=1}^{m}\sum_{j=1}^{m}x_{i,j}}{m \times n} \quad \text{Equation 1}$$

Other examples of block complexities determined by the processor 302 include block gradient, DCT coefficients and edges. For example, block complexity from block gradient in Equation 2 as:

$$G(X) = \frac{1}{n \times (n-1)}\sum_{i=1}^{n-1}\sum_{j=1}^{n}\sqrt{|x_{i,j}-x_{(i+1)j}|} \quad \text{Equation 2}$$

In addition to the determined block complexities, the processor 302 also selects the QP values for each block of pixels based on the visually perceived coding artifacts produced by the selected QP values, as described above. The processor 302 selects, from a group of stored QP values (e.g., a look up table), the highest QP value determined to produce an image having a target visually perceived quality.

The target visually perceived quality is, for example, a quality in which the image does not include visually perceived coding artifacts, as described above. For example, the processor 302 selects the highest QP value determined to produce an image without visually perceived (i.e., noticeable) coding artifacts. The determination of whether a displayed image has a target visually perceived quality (e.g., whether a displayed image does not include visually perceived coding artifacts) is previously determined (e.g., using prior testing/training) from encoding a plurality of blocks of different complexities at different QP values and viewing the resulting image. An example of such testing/training is shown in FIG. 5.

Figure 5:
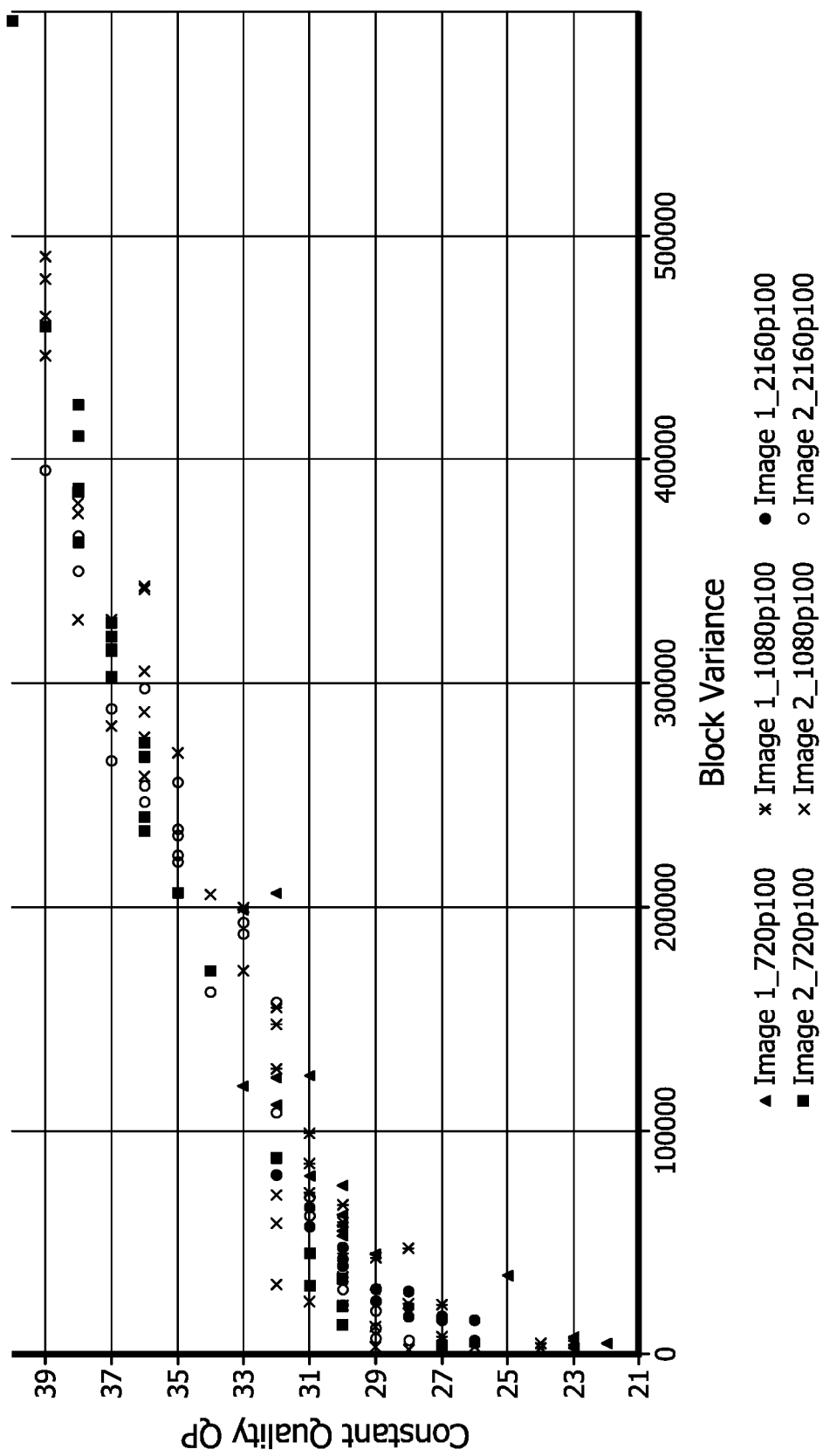
FIG. 5 is a graphical illustration showing the relationship between constant quality QP and block variance.

FIG. 5 is a graphical illustration showing the relationship between constant quality QP and block variance. The horizontal axis in FIG. 5 represents pixel block variance for a 16×16 block. The vertical axis in FIG. 5 represents the highest QP values which produce blocks having a target visually perceived quality (e.g., highest quantization before coding artifacts become noticeable). The pixel block variance values shown in FIG. 5 range from 0 to 60,000 and the QP values shown in FIG. 5 range from 23-39. For example, a QP value of 26 applied to a block with a variance 20,000 results in a visually perceived quality that is similar to the visually perceived quality when a QP value of 35 is applied to a block with a variance of 200,000. For more complex blocks, such as a block with a variance of 600,000, a higher QP value of 40 is needed to achieve the similar perceived quality. As the variance increases, the QP is increased to create a target visually perceived quality.

Figure 6:
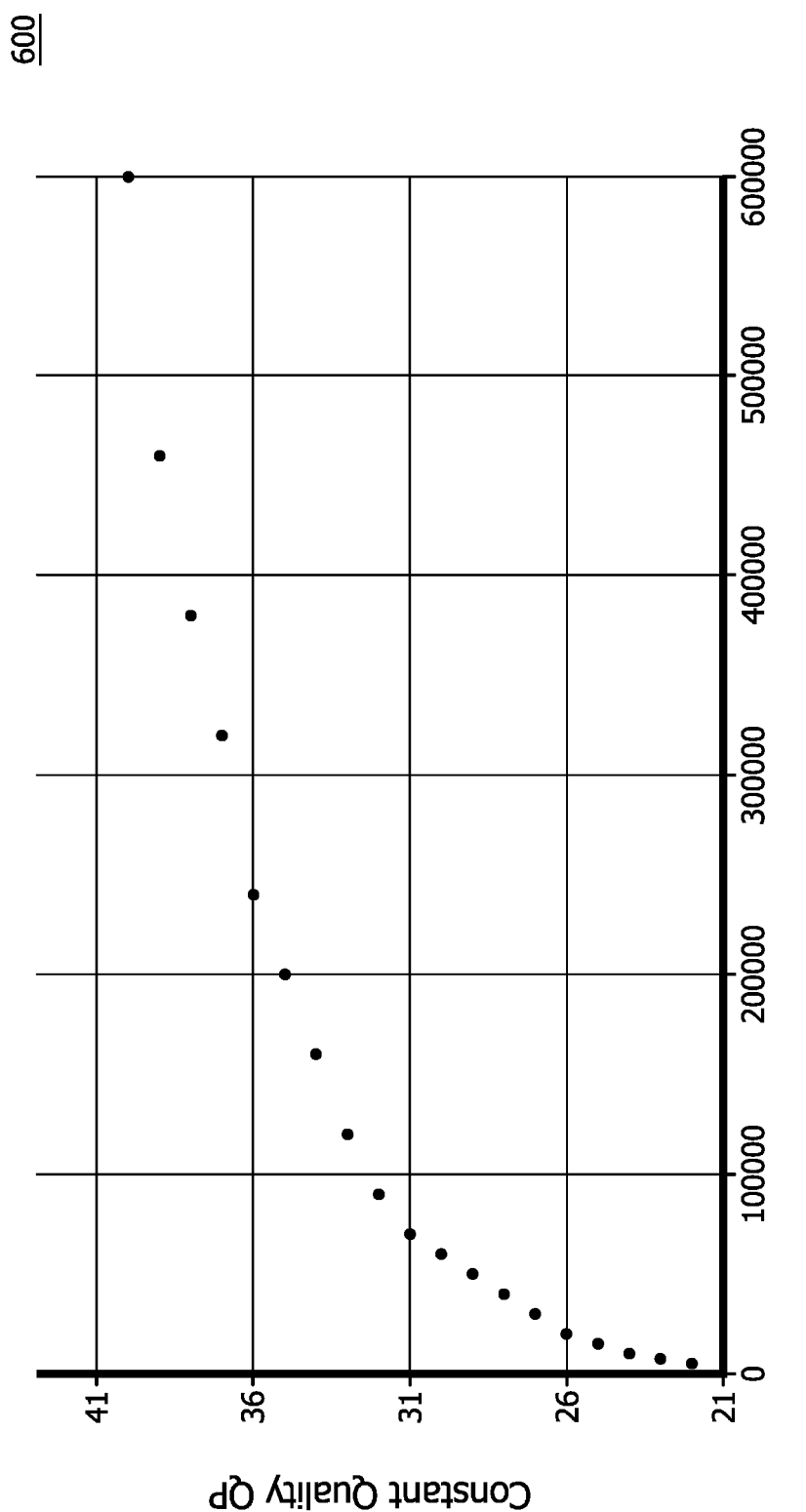
FIG. 6 is a graphical illustration of a look up table derived from the results of the testing shown in FIG. 5.

As described above, the processor 302 selects, for example, a QP value using a group of stored QP values. For example, the group of stored values can be stored in a look up table. FIG. 6 is a graphical illustration of variance values and QP values derived from the results of the testing shown in FIG. 5. The variance values and corresponding QP values shown in FIG. 6 are stored, for example, in a look up table to be used by the processor 302 to select QP values for a determined block variance. The horizontal axis in FIG. 6 represents the pixel block variance. The vertical axis represents constant quality QP values. FIG. 6 shows the highest QP values determined to produce an image having a target visually perceived quality without visually perceived (i.e., noticeable) coding artifacts. For example, using the stored values in a look up table based on the values shown in FIG. 6, when a block is determined by the processor 302 to have a variance of about 20,000 (e.g. within a predetermined range of 20,000), the processor selects a QP value of 35. Likewise, when a block is determined by the processor 302 to have a variance within a predetermined range of 30,000, the processor selects a QP value of 37.

That is, using the QP values and variance values shown in FIG. 6, the highest QP value determined to produce an image resulting in a target visually perceived quality (i.e., without visually perceived artifacts) is selected for each block of a corresponding variance. By using these selected QP values, a constant quality QP map of the blocks for the frame is generated such that that the blocks in the frame have constant quality (i.e., similarly visually perceived quality). The QP map is used by the processor 302 to reallocate (e.g., saves) bits from blocks encoded with higher QP values to blocks encoded with lower QP values to meet a target bit rate while providing an overall better visual quality.

Figure 7:
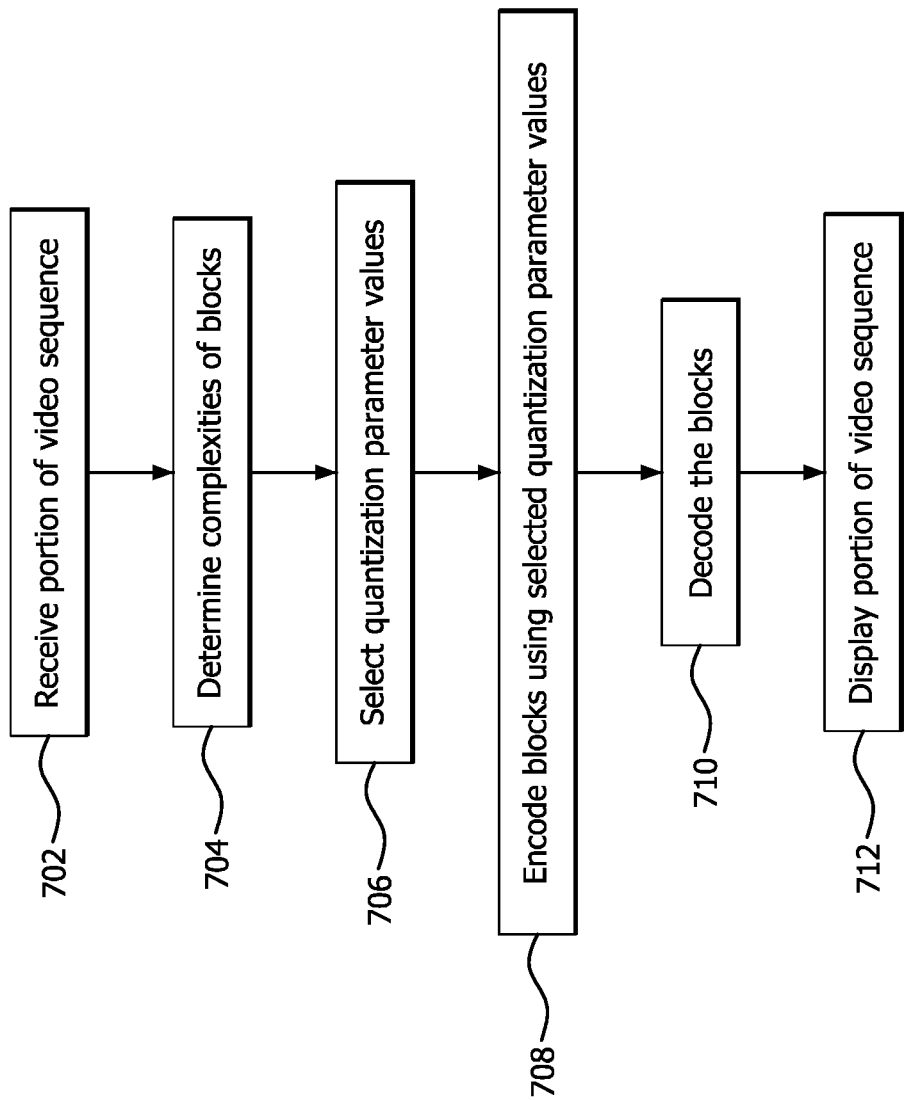
FIG. 7 a flow diagram illustrating an example video encoding method according to features of the disclosure.

FIG. 7 is a flow diagram illustrating an example video encoding method according to features of the disclosure.

As shown at block 702, the method 700 includes receiving a portion of a video sequence. Portions of a video sequence include, for example, a frame or image, a portion of a frame or image, a slice or a plurality of pixel blocks.

As shown at block 704, the method 700 includes determining complexities for blocks of pixels of the portion of the video sequence. For example, a pixel variance is determined as the complexity parameter for blocks of pixels of a frame. Examples of other types of measurements of complexity, which can be used alternative to or in addition to the variance, include gradient, DCT coefficients and edges. A reason for using pixel variance as a complexity parameter for determining a QP value, however, is because pixel variance has a high correlation with spatial masking.

As shown at block 706, the method 700 includes selecting, for each block of pixels, a QP value based on the complexity of the block and visually perceived coding artifacts of the block produced by the QP value. The visually perceived qualities of different images, quantized at the same constant QP value, vary depending on the complexities of the images. Accordingly, the QP value is selected based on a complexity (e.g., variance) of the block.

In addition, as described above, in block-based video coding, blocks of pixels are typically quantized separately in the coding process. When blocks are quantized with higher QP values, blocking artifacts (i.e., visually perceived lines representing the borders between adjacent blocks) are typically the most noticeable type of visual distortion of the resulting image. In addition, other artifacts are well correlated to these blocking artifacts. Accordingly, blocking artifacts can be used as a quality indicator to determine which constant QP value is to be selected.

By using the block complexity and visually perceived coding artifacts produced by the block for the selected QP values, when displayed, the blocks of the frame have a similar visually perceived quality.

In one example, the highest QP value is selected, from a group of stored QP values (e.g., via a look-up table), to produce an image having a target visually perceived quality. That is, the highest QP value is selected, from a group of stored QP values (e.g., via a look-up table), to produce an image without visually perceived artifacts.

As shown at block 708, the method 700 includes encoding the blocks of pixels using the selected QP values. For example, a QP map is generated from the selected QP values, and bits from blocks encoded with higher QP values are reallocated (e.g., saved) to blocks encoded with lower QP values to meet the target bit rate while providing an overall better visual quality. The encoded blocks are provided to a decoder, for example, over one or more networks (e.g., local area network), including wired (e.g., Ethernet) or wireless networks (e.g., via WiFi, Bluetooth, and other wireless standards). Alternatively, the encoded blocks are provided to a decoder on the same processing apparatus (e.g., via a local device bus).

As shown at blocks 710 and 712, the method 700 includes decoding the blocks of pixels (e.g., of a frame) and displaying the frame (image). The blocks of pixels are decoded using the corresponding quantization parameter values used to encode the blocks of pixels. For example, decoding of the blocks of pixels includes decoding of a video sequence which comprises bits allocated from less complex blocks to more complex blocks in which visually perceived coding artifacts are more noticeable than for the less complex blocks. Decoding of the blocks of pixels also includes decoding of a video sequence which comprises bits reallocated from blocks encoded with higher quantization parameter values to blocks encoded with lower quantization parameter values to meet a target bit rate.

It should be understood that many variations are possible based on the disclosure herein. Although features and elements are described above in particular combinations, each feature or element can be used alone without the other features and elements or in various combinations with or without other features and elements The various functional units illustrated in the figures and/or described herein (including, but not limited to, the processor 102, 302, the input driver 112, the input devices 108, the output driver 114, the output devices 110, the accelerated processing device 116, the scheduler 136, the graphics processing pipeline 134, the compute units 132, the SIMD units 138, encoder 140, transceiver 304 and cache 306 may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A video encoding method comprising:
   determining a respective complexity for each of a plurality of blocks of pixels of a portion of a video sequence, wherein the portion of the video sequence is formed from the plurality of blocks;
   retrieving, from a memory, a relationship between constant quality quantization parameters (QPs) and measures of dispersion of blocks of pixels from a different video sequence, wherein the constant quality QPs are a highest QP values which produce blocks having a target visually perceived quality;

selecting, from a group of QP values, QP values for the plurality of blocks using the relationship and
encoding the plurality of blocks of the portion using the QP values, wherein the QP values include at least two different QP values.

2. The method of claim 1, wherein the respective complexity of a respective block is determined from a variance of the respective block.

3. The method of claim 1, wherein the respective complexity of a respective block is determined from a gradient of the respective block.

4. The method of claim 1, wherein the portion of the video sequence is a frame.

5. The method of claim 1, wherein the target visually perceived quality is a quality in which an image contained in the plurality of blocks does not include visually perceived coding artifacts.

6. The method of claim 1, wherein the constant quality quantization parameters are parameters which produce the target visually perceived quality for the respective complexity such that, when displayed, the plurality of the blocks of the pixels have a similar visually perceived quality.

7. The method of claim 1, further comprising reallocating bits from blocks encoded with higher quantization parameter values to blocks encoded with lower quantization parameter values to meet a target bit rate.

8. The method of claim 7, further comprising:
generating a quantization parameter value map comprising the quantization parameter values for the plurality of the blocks of the pixels; and
reallocating bits from the blocks encoded with higher quantization parameter values to the blocks encoded with lower quantization parameter values using the quantization parameter value map.

9. The method of claim 1, further comprising receiving the portion of the video sequence from an input device.

10. The method of claim 9, wherein the input device is one of a image sensor, an image capture device, an image sensor, a biometric input device, a storage device, a device for generating graphics, or a network connection.

11. The method of claim 1, further comprising:
decoding the plurality of blocks of the pixels; and
providing the portion of the video sequence for display.

12. The method of claim 1, wherein each respective quantization parameter value in the group of the quantization parameter values, is a highest quantization parameter value determined to produce an image having the target visually perceived quality for an associated complexity.

13. A processing apparatus comprising:
memory that stores a relationship between constant quality quantization parameters (QPs) and measures of dispersion of blocks of pixels from a different video sequence, wherein the constant quality QPs are a highest QP values which produce blocks having a target visually perceived quality; and
one or more processors that are communicatively coupled to the memory, wherein the one or more processors are collectively configured to:
receive a plurality of blocks of pixels of a portion of a video sequence;
determine a respective complexity of each of the plurality of the blocks of the pixels of the portion of the video sequence;
retrieve the relationship from the memory;
select, from a group of QP values, QP values for the plurality of blocks using the relationship; and
encode the plurality of blocks of the portion using the QP values wherein the quantization parameter values include at least two different QP values.

14. The processing apparatus of claim 13, wherein the respective complexity of a respective block is determined from a variance of the respective block.

15. The processing apparatus of claim 13, wherein the respective complexity of a respective block is determined from a gradient of the respective block.

16. The processing apparatus of claim 13, wherein the portion of the video sequence is a frame.

17. The processing apparatus of claim 13, wherein the target visually perceived quality is a quality in which an image contained in the plurality of blocks does not include visually perceived coding artifacts.

18. The processing apparatus of claim 13, wherein the constant quality quantization parameters are parameters—which produce the target visually perceived quality for the respective complexity such that, when displayed, the plurality of the blocks of the pixels have a similar visually perceived quality.

19. The processing apparatus of claim 13, wherein the one or more processors are further collectively configured to:
reallocate bits from blocks encoded with higher quantization parameter values to blocks encoded with lower quantization parameter values to meet a target bit rate.

20. The processing apparatus of claim 19, wherein the one or more processors are further configured to:
generate a quantization parameter value map comprising the quantization parameter values for the blocks of pixels; and
reallocate bits from the blocks encoded with higher quantization parameter values to the blocks encoded with lower quantization parameter values using the quantization parameter value map.

21. The processing apparatus of claim 13, wherein the one or more processors are further collectively configured to:
receive the portion of the video sequence from an input device.

22. The processing apparatus of claim 21, wherein the input device is one of an image sensor, an image capture device, a biometric input device, a storage device, a device for generating graphics, or a network connection.

23. The processing apparatus of claim 13, wherein the one or more processors are further collectively configured to:
decode the plurality of the blocks of the pixels; and
provide the portion of the video sequence for display on a display device.

24. A video decoding method comprising:
receiving a plurality of blocks of pixels of a portion of an encoded video sequence encoded,
retrieving, from a memory, a relationship between constant quality quantization parameters (QPs) and measures of dispersion of blocks of pixels from a different video sequence, wherein the constant quality QPs are a highest QP values which produce blocks having a target visually perceived quality;
decoding the plurality of blocks using quantization parameter values, wherein each of the quantization parameter values is selected from a group of QP values using the relationship,
wherein the quantization parameter values include at least two different quantization values.

25. The method of claim 24, wherein the encoded video sequence is formed by allocating bits from less complex blocks to more complex blocks in which visually perceived coding artifacts are more noticeable than for the less complex blocks.

26. The method of claim 24, wherein the encoded video sequence comprises bits reallocated from blocks encoded with higher quantization parameter values to blocks encoded with lower quantization parameter values to meet a target bit rate.

27. A non-transitory computer readable medium comprising instructions for causing a computer to execute a video encoding method comprising:
- determining a respective complexity for each of a plurality of blocks of pixels of a portion of a video sequence, wherein the portion of the video sequence is formed from the plurality of blocks;
- retrieving a relationship between constant quality quantization parameters (QPs) and measures of dispersion of blocks of pixels from a different video sequence, wherein the constant quality QPs are a highest QP values which produce blocks having a target visually perceived quality;
- selecting, from a group of QP values, QP values for the plurality of blocks using the relationship and
- encoding the plurality of blocks of the portion using the QP values, wherein the QP values include at least two different QP values.

* * * * *